(12) United States Patent
Yuta et al.

(10) Patent No.: US 9,669,680 B2
(45) Date of Patent: Jun. 6, 2017

(54) ALIGNMENT ADJUSTMENT DEVICE

(71) Applicant: HONDA MOTOR CO., LTD., Tokyo (JP)

(72) Inventors: Atsushi Yuta, Wako (JP); Tetsu Ogawa, Wako (JP); Yutaka Hozumi, Wako (JP); Takashi Yanagi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 129 days.

(21) Appl. No.: 14/816,539

(22) Filed: Aug. 3, 2015

(65) Prior Publication Data
US 2016/0109214 A1 Apr. 21, 2016

(30) Foreign Application Priority Data

Oct. 16, 2014 (JP) ................................. 2014-211321

(51) Int. Cl.
G01B 5/255 (2006.01)
B60G 21/05 (2006.01)
B62D 17/00 (2006.01)

(52) U.S. Cl.
CPC .......... *B60G 21/051* (2013.01); *B62D 17/00* (2013.01); *B60G 2200/4622* (2013.01); *B60G 2206/20* (2013.01); *B60G 2206/50* (2013.01); *B60G 2400/204* (2013.01); *B60G 2400/33* (2013.01); *B60G 2400/39* (2013.01); *B60G 2400/41* (2013.01)

(58) Field of Classification Search
CPC .............................. B60G 21/051; B62D 17/00

USPC ................................. 33/203, 203.18, 203.19
See application file for complete search history.

(56) References Cited

U.S. PATENT DOCUMENTS

| | | | | |
|---|---|---|---|---|
| 4,151,655 A | * | 5/1979 | Makarainen | B60B 3/14 200/61.44 |
| 5,987,761 A | * | 11/1999 | Ohnesorge | G01B 5/255 33/203.18 |
| 2005/0146111 A1 | * | 7/2005 | Yamazaki | B60G 3/20 280/124.135 |
| 2006/0174501 A1 | * | 8/2006 | Harrill | B60G 3/26 33/288 |
| 2006/0185180 A1 | * | 8/2006 | MacKelvie | G01B 5/255 33/203.18 |

(Continued)

FOREIGN PATENT DOCUMENTS

| | | |
|---|---|---|
| JP | 2007-510569 A | 4/2007 |
| JP | 2011-207331 A | 10/2011 |

(Continued)

OTHER PUBLICATIONS

Office Action dated Sep. 6, 2016, issued in counterpart Japanese Patent Application No. 2014-211321. (3 pages).

*Primary Examiner* — G. Bradley Bennett
(74) *Attorney, Agent, or Firm* — Westerman, Hattori, Daniels & Adrian, LLP

(57) ABSTRACT

An alignment adjustment device includes an actuator that is fixed to a vehicle body side support member and that is connected to an outer peripheral surface of a hub carrier so as to rotate the hub carrier. An intersection between a first axis and a second axis and an intersection of a universal joint are both positioned inside a wheel, and the intersection of the universal joint is inside the hub carrier.

7 Claims, 6 Drawing Sheets

(56) References Cited

U.S. PATENT DOCUMENTS

| | | | |
|---|---|---|---|
| 2009/0140502 A1* | 6/2009 | Sasaki | B62D 17/00 280/5.522 |
| 2010/0019465 A1* | 1/2010 | Yuta | B60G 3/20 280/86.758 |
| 2012/0041649 A1* | 2/2012 | Yanagi | B60G 17/015 701/49 |
| 2012/0049469 A1 | 3/2012 | Michel et al. | |
| 2014/0245623 A1* | 9/2014 | Olesky | G01B 5/255 33/203 |
| 2016/0377407 A1* | 12/2016 | Herrmann | G01B 21/26 33/203 |

FOREIGN PATENT DOCUMENTS

| | | |
|---|---|---|
| JP | 2011-207332 A | 10/2011 |
| WO | 2009/057748 A1 | 5/2009 |

\* cited by examiner

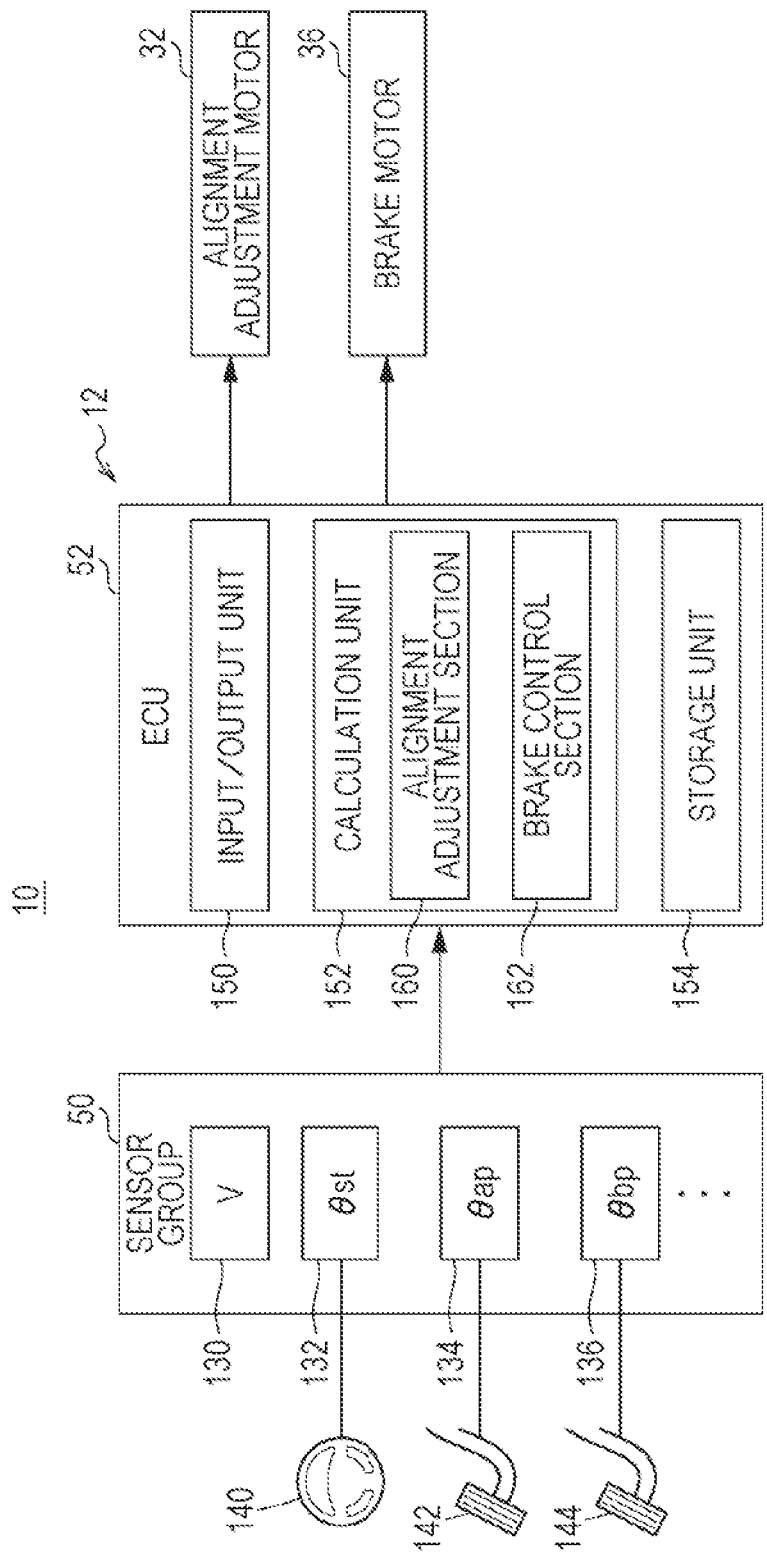

ALIGNMENT ADJUSTMENT DEVICE

CROSS REFERENCES TO RELATED APPLICATIONS

The present application claims priority under 35 U.S.C. §119 to Japanese Patent Application No. 2014-211321, filed Oct. 16, 2014, entitled "Alignment Adjustment Device." The contents of this application are incorporated herein by reference in their entirety.

TECHNICAL FIELD

The present disclosure relates to an alignment adjustment device that is capable of adjusting an alignment of a vehicle wheel.

BACKGROUND

In U.S. Patent Application Publication No. 2012/0049469, a carrier part 12 and a guide part 14 are provided with servomotors 26 and 28, and rotary parts 16 and 18 are connected to the servomotors 26 and 28 in driving relationship with toothed belts 30 (FIGS. 1 and 2, [0032]). The rotary parts 16 and 18 are rotated in the same direction or in opposite directions by the servomotors 26 and 28. With the above, the carrier part 12 executes a pivoting motion or a wobbling motion to change the toe angle and/or camber angle of the wheel ([0032]). In other words, a mechanism that adjusts the toe angle and/or camber angle (toe angle/camber angle adjustment mechanism) is configured of the carrier part 12, the guide part 14, the rotary parts 16 and 18, the servomotors 26 and 28, and the toothed belts 30.

Furthermore, U.S. Patent Application Publication No. 2012/0049469 employs a universal joint (a cardan shaft 60) (FIG. 2, [0043]).

SUMMARY

As described above, U.S. Patent Application Publication No. 2012/0049469 is provided with the toe angle/camber angle adjustment mechanism configured of the carrier part 12, the guide part 14, the rotary parts 16 and 18, the servomotors 26 and 28, and the toothed belts 30, and the universal joint (cardan shaft 60) (FIGS. 1 and 2).

As illustrated in FIG. 2 of U.S. Patent Application Publication No. 2012/0049469, the toe angle/camber angle adjustment mechanism and a bell-shaped joint housing 62 of the universal joint (cardan shaft 60) are disposed so as to be displaced with respect to each other in the rotation axis 22 direction. With the above, the inside diameter of the toe angle/camber angle adjustment mechanism (in this case, the inside diameter of a hub portion 42 (FIG. 3)) is smaller than the maximum outside diameter of the bell-shaped joint housing 62.

As described above, when the inside diameter of the toe angle/camber angle adjustment mechanism (in this case, the inside diameter of the hub portion 42) is smaller than the maximum outside diameter of the bell-shaped joint housing 62, in order to receive the braking torque that is input to the guide part 14 from the wheel 32 through the carrier part 12, the outputs of the servomotors 26 and 28 need to be increased greatly or a bellows 74 needs to be provided (FIG. 4 of U.S. Patent Application Publication No. 2012/0049469). Greatly increasing the outputs of the servomotors 26 and 28 or providing the bellows 74 leaves room for improvement from the viewpoint of space saving and energy saving.

For example, the present disclosure has been disclosed in view of the above shortcomings and describes an alignment adjustment device that is capable of facilitating space saving and energy saving.

An alignment adjustment device according to one aspect of the present disclosure includes a hub connected to a wheel; a hub carrier that supports the hub in a relatively rotatable manner about a first axis; a vehicle body side support member that is provided in a suspension device of a vehicle, the vehicle body side support member supporting the hub carrier in a relatively rotatable manner about a second axis that intersects the first axis; a brake disc provided in the hub; a brake caliper provided on the hub carrier; drive shaft that transmits a torque from a driving source to the hub through a universal joint; and an actuator that is fixed to the vehicle body side support member and that is connected to an outer peripheral surface of the hub carrier so as to rotate the hub carrier. In the alignment adjustment device, an intersection between the first axis and the second axis and an intersection of the universal joint are both positioned inside the wheel, and the intersection of the universal joint is disposed inside the hub carrier.

Accordingly, since the universal joint is disposed inside the hub carrier, the diameter of the hub carrier becomes relatively large. The braking torque that is received by the brake caliper is transmitted to the actuator that is connected to the outer periphery of the hub carrier with a large diameter. Accordingly, even if the actuator is small, reception of the braking torque is facilitated. Accordingly, by preventing the actuator from becoming large, space can be saved. Alternatively, when the actuator is actuated, if there is no need to deform a member such as the metal bellows 74 of U.S. Patent Application Publication No. 2012/0049469, the required output of the actuator can be small and, accordingly, energy saving can be facilitated.

The alignment adjustment device may further include a screw mechanism that is formed of a first screw portion on an actuator side and a second screw portion on a hub carrier side. By actively actuating the actuator, the hub carrier is relatively rotated about the second axis. With the above, an alignment (a toe angle and a camber angle) of the vehicle wheel can be adjusted. Furthermore, the screw mechanism connects the actuator and the hub carrier. In the screw mechanism, a frictional force occurs between the first screw portion and the second screw portion. Accordingly, even if an external force (for example, a braking torque) acts on the screw mechanism while the actuator is in a stopped state, relative movement between the first screw portion and the second screw portion does not easily occur (a self-lock effect). Accordingly, change in alignment caused by the external force can be suppressed. Additionally, compared to the metal bellows 74 of U.S. Patent Application Publication No. 2012/0049469, the screw mechanism, owing to its structure, can save space. Alternatively, when the actuator is actuated, if there is no need to deform a member such as the metal bellows 74 of U.S. Patent Application Publication No. 2012/0049469, the required output of the actuator can be small and, accordingly, energy saving can be facilitated.

In a case in which the actuator is a motor, the first screw portion may be a worm formed on an output shaft of the motor, and the second screw portion may be a screw portion formed on an outer periphery of the hub carrier that functions as a worm wheel. With the above, a self-lock effect can be brought about with a simple configuration.

BRIEF DESCRIPTION OF THE DRAWINGS

The advantages of the disclosure will become apparent in the following description taken in conjunction with the following drawings.

FIG. 6 is a diagram illustrating a control system of the alignment adjustment device.

DETAILED DESCRIPTION

A. Exemplary Embodiment

A1. Configuration of Vehicle 10

A1-1. Overall Configuration of Vehicle 10

Figure 1:
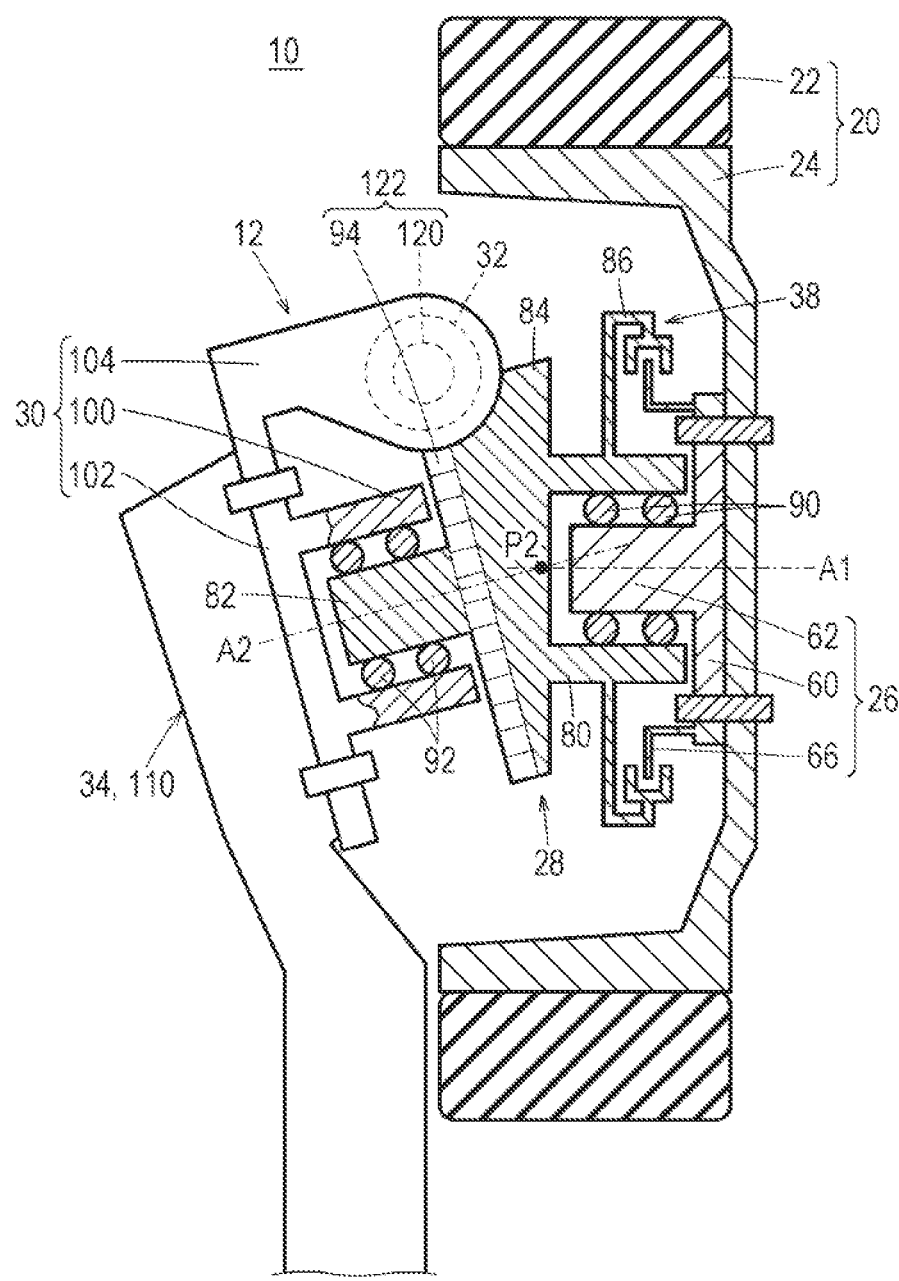
FIG. 1 is a partial cross-sectional bottom view illustrating a simplified or a modeled configuration of a vehicle equipped with an alignment adjustment device according to an exemplary embodiment of the present disclosure.
Figure 2:
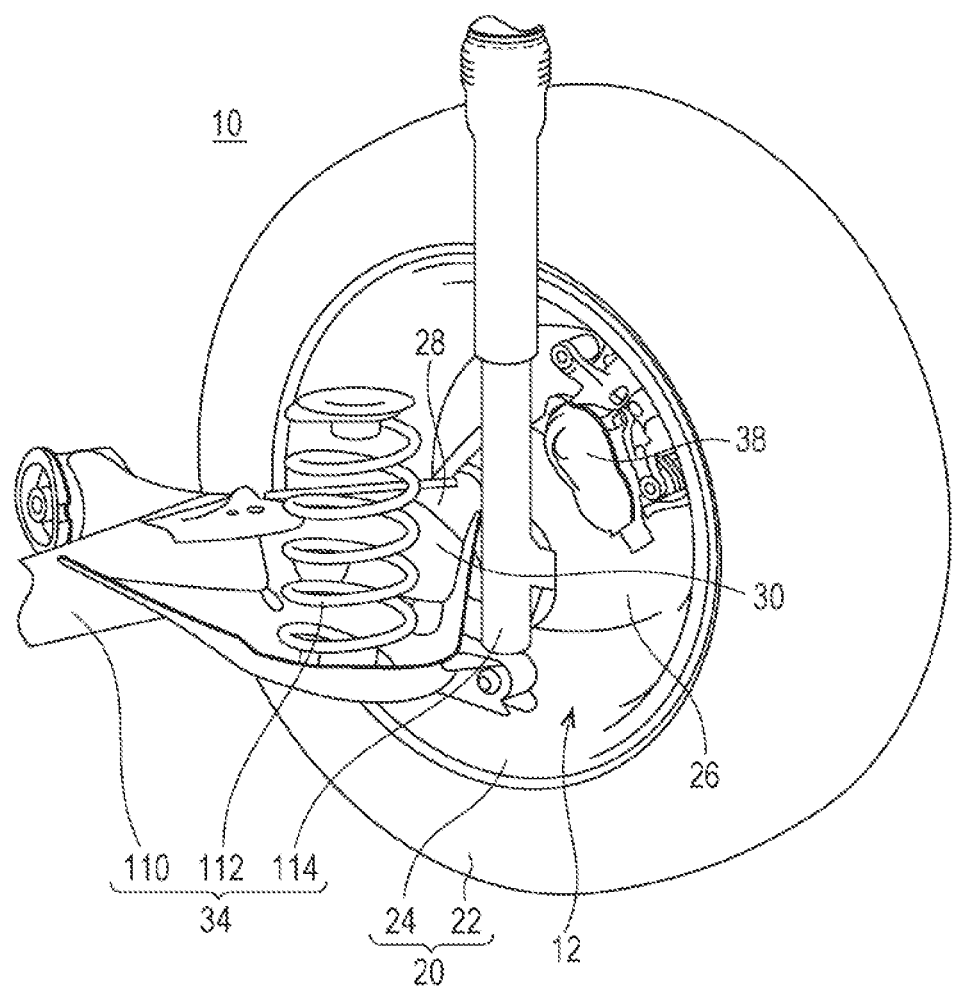
FIG. 2 is an external perspective view schematically illustrating a portion of the vehicle equipped with the alignment adjustment device.
Figure 3:
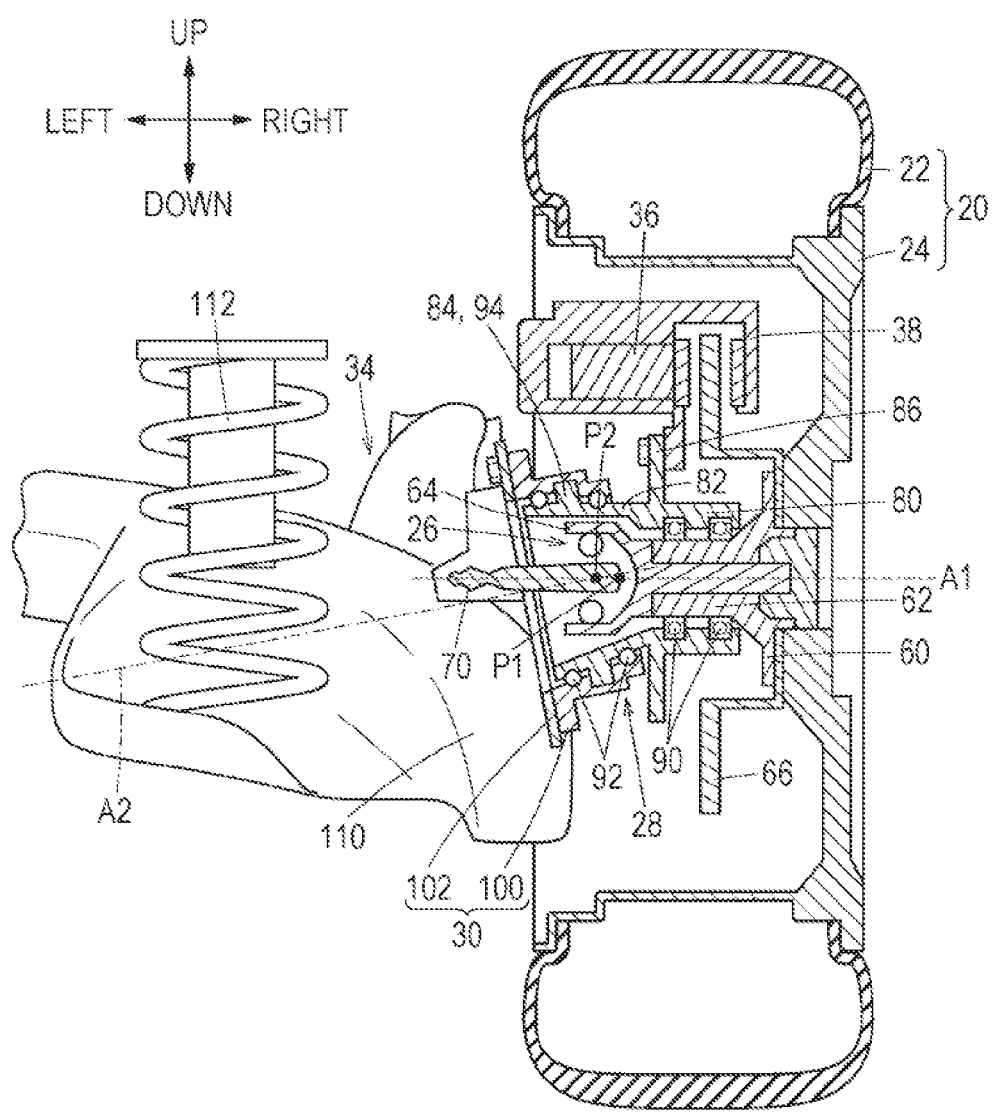
FIG. 3 is a first partial cross-sectional view (a rear cross-sectional view) illustrating a cross-section of a portion of the alignment adjustment device.
Figure 4:
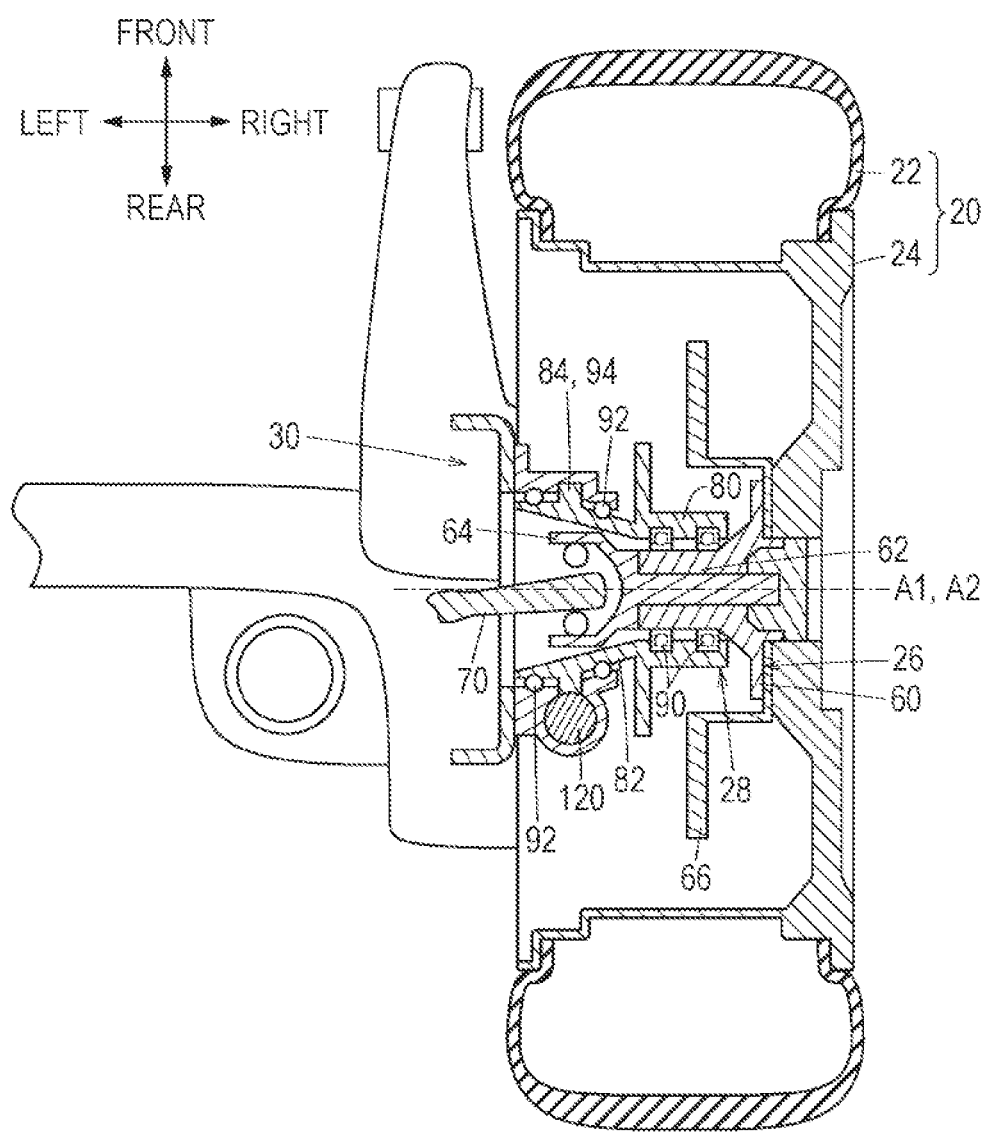
FIG. 4 is a second partial cross-sectional view (a planar cross-sectional view) illustrating a cross-section of a portion of the alignment adjustment device.
Figure 5:
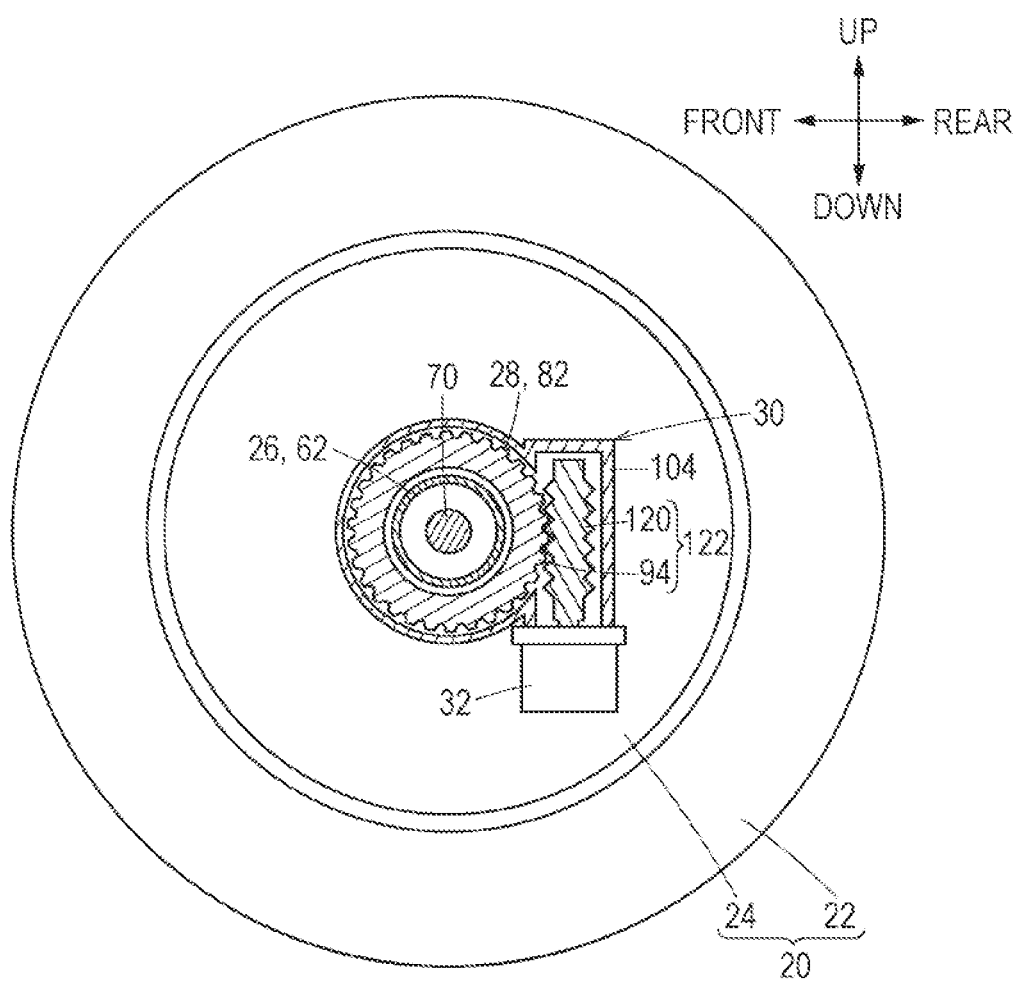
FIG. 5 is a diagram of a portion of the alignment adjustment device viewed from an inner side towards an outer side of the vehicle.

FIG. 1 is a partial cross-sectional bottom view illustrating a simplified or a modeled configuration of a vehicle 10 equipped with an alignment adjustment device 12 according to an exemplary embodiment of the present disclosure. FIG. 2 is an external perspective view schematically illustrating a portion of the vehicle 10 equipped with the alignment adjustment device 12. FIGS. 3 and 4 are first and second partial cross-sectional views (a rear cross-sectional view and a planar cross-sectional view) each illustrating a cross-section of a portion of the alignment adjustment device 12. FIG. 5 is a diagram of a portion of the alignment adjustment device 12 viewed from an inner side towards an outer side of the vehicle 10. FIG. 6 is a diagram illustrating a control system of the alignment adjustment device 12. Note that in order to facilitate understanding, the configuration illustrated in FIG. 1 is simplified when compared with FIG. 2 to 4, and portions (a vehicle body side connection portion 82 and the like described later) of the configuration are deformed.

The vehicle 10 according to the present exemplary embodiment is a four-wheeled vehicle including four vehicle wheels 20 (tire assemblies) each including a tire 22 (a resin portion) and a wheel 24 (a metal portion); however, the vehicle 10 may be a three-wheeled vehicle, a six-wheeled vehicle, or the like. Furthermore, while the vehicle 10 is a rear-wheel drive (FR) vehicle, the vehicle 10 may be, for example, a front-wheel drive (FF) vehicle or a four-wheel drive vehicle. Furthermore, in FIGS. 1 to 5, while the right rear vehicle wheel 20 (the rear wheel serving as a driving wheel) of the vehicle 10 is mainly illustrated, the same configuration may also be employed to the left rear vehicle wheel 20. Furthermore, the alignment adjustment device 12 can also be applied to the left front and the right front vehicle wheels 20 (the front wheels serving as driven wheels).

As illustrated in FIG. 1 and the other drawings, in addition to the vehicle wheel 20, the vehicle 10 includes a hub 26, a hub carrier 28, a vehicle body side support member 30, an alignment adjustment motor 32 (an actuator), a suspension device 34, a brake motor 36 (FIG. 3), and a brake caliper 38. As illustrated in FIG. 6, the vehicle 10 further includes a sensor group 50 and an electronic control device 52 (hereinafter, referred to as an "ECU 52").

A1-2. Vehicle Wheel 20

The tire 22 is fixed to the outer periphery of the wheel 24, and the inner surface of the wheel 24 is connected to or fixed to the hub 26. With the above, the tire 22, the wheel 24, and the hub 26 rotate together about an axis A1 (a first axis).

A1-3. Hub 26

As illustrated in FIGS. 1, 3, and 4, the hub 26 includes a wheel fixing portion 60 that is fixed to the wheel 24, a rotating shaft portion 62, a universal joint 64, and a brake disc 66 (in FIG. 1, the universal joint 64 is not shown). The universal joint 64 is connected to a propeller shaft 70 (FIG. 3). As illustrated in FIG. 3 and the other drawings, an intersection P1 of the universal joint 64 is positioned inside the wheel 24 and is disposed on the inner side of the hub carrier 28. The intersection P1 herein signifies an intersection between the universal joint 64 and the propeller shaft 70, and the position of the intersection P1 changes in accordance with the position of the propeller shaft 70. Note that the propeller shaft 70 is not shown in FIG. 1 and a portion of the propeller shaft 70 is not shown in FIGS. 3 and 4.

A1-4. Hub Carrier 28

The hub carrier 28 rotatably supports the hub 26 about the axis A1 (the first axis) and is rotatably supported by the vehicle body side support member 30 about a second axis A2 that intersects the axis A1. The hub carrier 28 includes a hub connection portion 80 (a vehicle wheel side connection portion), the vehicle body side connection portion 82, and a worm wheel portion 84. The hub carrier 28 according to the present exemplary embodiment further includes a caliper support 86 for supporting the brake caliper 38. The hub connection portion 80 is a cylindrical portion and first bearings 90 are disposed therein. With the above, the hub connection portion 80 rotatably supports the rotating shaft portion 62 of the hub 26 about the axis A1 through the first bearings 90.

The vehicle body side connection portion 82 is a portion that is supported by the vehicle body side support member 30 through second bearings 92. The worm wheel portion 84 is a portion in which its opening portion on the vehicle body side is obliquely inclined with respect to the axis A1 and has a shape that is similar to that of the rotary part 16 in FIGS. 2 to 4 of U.S. Patent Application Publication No. 2012/0049469, for example. Furthermore, a second screw portion 94 is formed on the outer periphery of the worm wheel portion 84. Note that in FIG. 1, the vehicle body side connection portion 82 and the worm wheel portion 84 are displaced in the second axis A2 direction; however, in FIGS. 3 and 4, the worm wheel portion 84 is positioned in the vehicle body side connection portion 82. In other words, in the second axis A2 direction, the worm wheel portion 84 is disposed between the second bearings 92 constituting the vehicle body side connection portion 82.

The caliper support 86 extends outwardly in the radial direction from the outer periphery of the hub connection portion 80 and supports the brake caliper 38.

A1-5. Vehicle Body Side Support Member 30

The vehicle body side support member 30 is a member that rotatably supports the hub carrier 28 about the second axis A2 intersecting the axis A1 (the first axis) and includes a hub carrier connection portion 100, a suspension connection portion 102, and a motor support 104.

The hub carrier connection portion 100 is a cylindrical portion and the second bearings 92 are disposed therein. With the above, the hub carrier connection portion 100 rotatably supports the vehicle body side connection portion 82 of the hub carrier 28 about the second axis A2 through the second bearings 92. In the above, the second axis A2 intersects the axis A1 (the first axis). As illustrated in FIG. 3 and the other drawings, an intersection P2 between the axis A1 and the second axis A2 is disposed inside the wheel 24. The suspension connection portion 102 is a portion that is fixed to a trailing arm 110 of the suspension device 34. The motor support 104 supports the alignment adjustment motor 32.

A1-6. Alignment Adjustment Motor 32

The alignment adjustment motor 32 is fixed to the motor support 104 of the vehicle body side support member 30, is actuated on the basis of a command from the ECU 52, and adjusts the alignment (a toe angle θt and a camber angle θc) of the vehicle wheel 20. As illustrated in FIG. 5, a worm 120 (a first screw portion) is disposed on an output shaft of the alignment adjustment motor 32. The worm 120 engages with a screw portion (the second screw portion 94) formed on the outer periphery of the worm wheel portion 84 of the hub carrier 28. A screw mechanism 122 is configured by the worm 120 and the second screw portion 94.

A1-7. Suspension Device 34

As illustrated in FIG. 2 and the other drawings, in addition to the trailing arm 110, the suspension device 34 includes a coil spring 112 and a hydraulic damper 114. Note that the suspension device 34 may have a configuration that is different from the configuration illustrated in FIG. 2 and the other drawings.

A1-8. Sensor Group 50

As illustrated in FIG. 6, the sensor group 50 includes a vehicle speed sensor 130, a steering wheel steering angle sensor 132 (hereinafter, also referred to as a "steering angle sensor 132"), an accelerator pedal operation amount sensor 134 (hereinafter, also referred to as an "AP sensor 134"), and a brake pedal operation amount sensor 136 (hereinafter, also referred to as a "BP sensor 136").

The vehicle speed sensor 130 detects a vehicle speed V [km/h] of the vehicle 10. The steering angle sensor 132 detects a steering angle θst (hereinafter, also referred to as a "steering wheel steering angle θst") [degree] of a steering wheel 140. The AP sensor 134 detects an operation amount θap (hereinafter, also referred to as an "accelerator operation amount θap") [degree] of an accelerator pedal 142. The BP sensor 136 detects an operation amount θbp (hereinafter, also referred to as a "brake operation amount θbp") [degree] of a brake pedal 144.

A1-9. ECU 52

The ECU 52 controls the alignment adjustment motor 32 and the brake motor 36 on the basis of detection values (the vehicle speed V and the like) from the sensor group 50. As illustrated in FIG. 6, the ECU 52 includes an input/output unit 150, a calculation unit 152, and a storage unit 154.

The calculation unit 152 includes an alignment adjustment section 160 and a brake control section 162. The alignment adjustment section 160 controls the alignment (the toe angle θt and the camber angle θc) of the vehicle wheel 20 on the basis of the vehicle speed V, the steering wheel steering angle θst, and the like. The brake control section 162 adjusts a pressing force of the brake caliper 38 against the brake disc 66 by controlling the output of the brake motor 36 on the basis of the vehicle speed V, the brake operation amount θbp, and the like.

The storage unit 154 includes a nonvolatile memory and a volatile memory (both not shown). The nonvolatile memory is, for example, a flash memory or an electrically erasable programmable read only memory (EEPROM), and a program and the like to execute processing in the calculation unit 152 are stored in the nonvolatile memory. The volatile memory is, for example, a dynamic random access memory (DRAM) and is used when the calculation unit 152 executes the processing.

A2. Rotation of Vehicle Wheel 20

As illustrated above, the vehicle wheel 20 illustrated in FIGS. 1 to 5 is a rear wheel serving as a driving wheel. When a running torque is output from a driving source (an engine or the like, not shown), the running torque reaches the universal joint 64 of the hub 26 through a differential gear (not shown) and the propeller shaft 70. Further, the running torque rotates the vehicle wheel 20 in an integrated manner through the rotating shaft portion 62 and wheel fixing portion 60 of the hub 26 (see FIG. 1). Note that when the vehicle wheel 20 is a driven wheel, the running torque from the driving source will not be transmitted to the vehicle wheel 20; however, the hub 26 operates in a similar manner.

A3. Adjustment of Toe Angle θt

In accordance with the traveling state of the vehicle 10, such as when traveling through a curve, the ECU 52 adjusts the toe angle θt of the vehicle wheel 20. Specifically, the ECU 52 calculates a target value of the toe angle θt (hereinafter, referred to as a "target toe angle θttar") on the basis of indexes such as the vehicle speed V, the steering wheel steering angle θst, and the accelerator operation amount θap.

Then, the ECU 52 controls the alignment adjustment motor 32 such that the calculated target toe angle θttar is implemented. In other words, when the alignment adjustment motor 32 rotates, in accordance with the rotation, the worm 120 rotates and, further, the hub carrier 28 rotates through the second screw portion 94 (FIGS. 1 and 5, and the other drawings). The second axis A2 that is the rotation axis of the hub carrier 28 is inclined with respect to the axis A1 (the rotation axis of the hub 26) (see FIGS. 1 and 3). Accordingly, the toe angle θt (and the camber angle θc) can be changed by controlling the alignment adjustment motor 32. Accordingly, the ECU 52 can adjust the toe angle θt by changing a rotation angle θmt of the alignment adjustment motor 32.

A4. Brake of Vehicle Wheel 20

When applying a brake to the vehicle wheel 20 with an operation of the brake pedal 144, the ECU 52 actuates the brake motor 36 and brings the brake caliper 38 in contact with the brake disc 66 of the hub 26 (see FIG. 3). With the above, with a frictional force and the like generated between the brake caliper 38 and the brake disc 66, a brake can be applied to the vehicle wheel 20.

A braking torque Tbr when applying a brake to the vehicle wheel 20 will be described. When the brake caliper 38 comes into contact with the brake disc 66, the braking torque Tbr generated by the brake caliper 38 is transmitted to the suspension device 34 (the trailing arm 110) through the hub carrier 28 (the caliper support 86 and the worm wheel portion 84 (the second screw portion 94)), the alignment adjustment motor 32 (including the worm 120), and the vehicle body side support member 30 (the motor support 104 and the suspension connection portion 102). With the above, a reaction force against the braking torque Tbr is generated from the vehicle body side (the suspension device 34 side) such that a brake can be effectively actuated on the vehicle wheel 20.

A5. Effect of Present Exemplary Embodiment

According to the present exemplary embodiment described above, since the universal joint 64 is disposed on the inner peripheral side of the hub carrier 28 (FIG. 3 and the other drawings), the diameter of the hub carrier 28 becomes relatively large. The braking torque Tbr that is received by the brake caliper 38 is transmitted to the alignment adjustment motor 32 (the actuator) that is connected to the outer periphery of the hub carrier 28 with a large diameter. Accordingly, even if the alignment adjustment motor 32 is small, reception of the braking torque Tbr is facilitated. Accordingly, by preventing the alignment adjustment motor 32 from becoming larger, space can be saved. Alternatively, when the alignment adjustment motor 32 is actuated, if there is no need to deform a member such as the metal bellows 74 of U.S. Patent Application Publication No. 2012/0049469, the required output of the alignment adjustment motor 32 can be small and, accordingly, energy saving can be facilitated.

In the present exemplary embodiment, the alignment adjustment device 12 further includes the screw mechanism 122 serving as a worm gear formed of the worm 120 (the first screw portion) on the alignment adjustment motor 32 (the actuator) side and the second screw portion 94 on the hub carrier 28 (a vehicle wheel side support member) side (FIG. 5).

According to the present exemplary embodiment, by actively actuating the alignment adjustment motor 32, the hub carrier 28 (the vehicle wheel side support member) is relatively rotated about the second axis A2 (see FIGS. 1 and 5). With the above, the alignment (the toe angle θt and the camber angle θc) of the vehicle wheel 20 can be adjusted. Furthermore, according to the present exemplary embodiment, the screw mechanism 122 that connects the alignment adjustment motor 32 and the hub carrier 28 is provided (FIG. 5). In the screw mechanism 122, a frictional force occurs between the worm 120 (the first screw portion) and the second screw portion 94. Accordingly, even if an external force (for example, the braking torque Tbr) acts on the screw mechanism 122 while the alignment adjustment motor 32 is in a stopped state, relative movement between the worm 120 and the second screw portion 94 does not easily occur (a self-lock effect). Accordingly, change in alignment (the toe angle θt) caused by an external force can be suppressed. Additionally, compared to the metal bellows 74 of U.S. Patent Application Publication No. 2012/0049469, the screw mechanism 122, owing to its structure, can save space. Alternatively, when the alignment adjustment motor 32 is actuated, since there is no need to deform a member such as the metal bellows 74 of U.S. Patent Application Publication No. 2012/0049469, the required output of the alignment adjustment motor 32 is smaller and, accordingly, energy saving can be facilitated.

In the present exemplary embodiment, the worm 120 that is formed on the output shaft of the alignment adjustment motor 32 (the motor), and the second screw portion 94 that is formed on the outer periphery of the hub carrier 28 (the vehicle wheel side support member) functioning as the worm wheel are provided (FIG. 5). With the above, the self-lock effect can be brought about with a simple configuration.

B. Modification

Note that not limited to the exemplary embodiment described above, it goes without saying that the present disclosure can employ various configurations based on the contents of the present description. For example, the following configurations can be employed.

B1. Subject of Application

In the exemplary embodiment described above, an example in which the alignment adjustment device 12 is applied to the vehicle 10 is described (FIG. 2 and the other drawings). However, when focusing on providing the screw mechanism 122, such as a worm gear or the like, as a portion of the alignment adjustment device 12, for example, then the application is not limited to the above. For example, the alignment adjustment device 12 can be applied to other devices as well.

B2. Alignment Adjustment Device 12

In the exemplary embodiment described above, the universal joint 64 is disposed on the inner peripheral side of the hub carrier 28 (FIG. 3 and the other drawings). However, from a viewpoint of employing the vehicle body side support member 30, for example, the above arrangement is not limited to the above. For example, as in FIG. 2 of the description of U.S. Patent Application Publication No. 2012/0049469, the universal joint 64 (the bell shaped portion) may be displaced towards the hub carrier 28 and in the axis A1 direction.

B3. Hub Carrier 28

In the exemplary embodiment described above, the hub carrier 28 includes the caliper support 86 that supports the brake caliper 38 (FIG. 1 and the other drawings). However, when focusing on providing the screw mechanism 122, such as a worm gear or the like, as a portion of the alignment adjustment device 12, for example, not limited to the above, the hub carrier 28 may not support the brake caliper 38. In such a case, the brake caliper 38 is supported by a member other than the hub carrier 28 (for example, the vehicle body side support member 30 or the suspension device 34).

B4. Alignment Adjustment Motor 32

In the exemplary embodiment described above, an electric motor is used as the alignment adjustment motor 32. However, for example, from the viewpoint of an actuator that rotates the hub carrier 28 (the vehicle wheel side support member) through the screw mechanism 122, the alignment adjustment motor 32 is not limited to an electric motor. For example, the alignment adjustment motor 32 may be a fluid pressure motor that uses oil pressure, air pressure, or the like. Alternatively, in place of the alignment adjustment motor 32 or the fluid pressure motor, a direct-acting actuator (a linear actuator) may be used. In such a case, the linear motion of the direct-acting actuator may be converted into a rotational motion of the hub carrier 28. In the above conversion, for example, the linear motion of the direct-acting actuator may be transmitted to a nut of a feed screw mechanism, the displacement of the nut may be converted into rotation of a trapezoidal screw thread, and, further, the rotation of the trapezoidal screw thread may be transmitted to the hub carrier 28.

B5. First Bearings 90 and Second Bearings 92

In the exemplary embodiment described above, the plurality of first bearings 90 that rotatably support the hub 26 are provided in the axis A1 direction (FIGS. 1, 3, and 4). However, for example, from a viewpoint of the hub carrier 28 rotatably supporting the hub 26, not limited to the above, only one or three or more first bearings 90 may be provided in the axis A1 direction.

In a similar manner, in the exemplary embodiment described above, the plurality of second bearings 92 that rotatably support the hub carrier 28 are provided in the axis A2 direction (FIGS. 1, 3, and 4). However, for example, from a viewpoint of the vehicle body side support member 30 rotatably supporting the hub carrier 28, not limited to the above, only one or three or more second bearings 92 may be provided in the axis A2 direction.

B6. Screw Mechanism 122

The screw mechanism 122 of the exemplary embodiment described above is a worm gear formed of the worm 120 (the first screw portion) and the second screw portion 94 on the hub carrier 28 (the vehicle wheel side support member) side (FIG. 5). However, from a viewpoint of bringing about the self-lock effect through a combination of the first screw portion on the alignment adjustment motor 32 side and the second screw portion on the hub carrier 28 (the vehicle wheel side support member) side, for example, the screw mechanism 122 is not limited to the above. For example, the screw mechanism 122 may be a feed screw mechanism including a trapezoidal screw thread and a nut that converts the rotational movement of the trapezoidal screw thread into a linear movement.

B7. Others

The exemplary embodiment described above is not provided with a member such as the metal bellows 57 of U.S. Patent Application Publication No. 2012/0049469 (see FIGS. 1, 3, and 4). However, for example, from a viewpoint of reinforcing the self-lock effect of the screw mechanism 122 ((from the viewpoint of making the relative movement between the worm 120 (the first screw portion) and the second screw portion 94 less likely to occur)), a member such as the metal bellows 57 can be provided in addition to the screw mechanism 122.

Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. An alignment adjustment device, comprising:
   a hub connected to a wheel;
   a hub carrier that supports the hub in a relatively rotatable manner about a first axis;
   a vehicle body side support member that is provided to a suspension device of a vehicle, the vehicle body side support member supporting the hub carrier in a relatively rotatable manner about a second axis that intersects the first axis;
   a brake disc provided to the hub;
   a brake caliper provided to the hub carrier;
   a drive shaft that transmits a torque from a driving source to the hub through a universal joint; and
   an actuator that is fixed to the vehicle body side support member and that is connected to an outer peripheral surface of the hub carrier so as to rotate the hub carrier, wherein
   an intersection between the first axis and the second axis and an intersection of the universal joint are both positioned inside the wheel, and the intersection of the universal joint is disposed inside the hub carrier.

2. The alignment adjustment device according to claim 1, further comprising
   a screw mechanism including a first screw portion on an actuator side and a second screw portion on a hub carrier side.

3. The alignment adjustment device according to claim 2, wherein
   the actuator is a motor,
   the first screw portion is a worm provided to an output shaft of the motor, and
   the second screw portion is a screw portion disposed on an outer periphery of the hub carrier that functions as a worm wheel.

4. The alignment adjustment device according to claim 1, wherein the intersection of the universal joint is an intersection between the universal joint and the drive shaft.

5. The alignment adjustment device according to claim 2, wherein a braking torque generated by the brake caliper is transmitted to the suspension device through the hub carrier, the actuator, and the vehicle body side support member.

6. The alignment adjustment device according to claim 3, wherein the hub carrier includes a hollow structure and the universal joint is disposed in the hollow structure.

7. A vehicle comprising the alignment adjustment device according to claim 1.

* * * * *